Feb. 5, 1929.  J. DAWSON  1,701,227

CRANK MECHANISM

Filed July 6, 1926

Inventor.
John Dawson.
by A. J. S. Drinston
atty.

Patented Feb. 5, 1929.

1,701,227

UNITED STATES PATENT OFFICE.

JOHN DAWSON, OF LEASIDE, ONTARIO, CANADA, ASSIGNOR, BY MESNE ASSIGNMENTS, TO DAWSON RECIPROCATING CRANK ACTIONS LIMITED, OF TORONTO, ONTARIO, CANADA.

CRANK MECHANISM.

Application filed July 6, 1926. Serial No. 120,782.

The principal object of the invention is to devise a crank mechanism for use in various classes of machinery to obtain a plurality of reciprocating movements of a pitman or connecting rod with one revolution of the crank shaft and to obtain a smooth and positive movement in each reciprocation.

The principal feature of the invention consists in the novel arrangement of a plurality of intersecting arc-shaped guide ways in a rotary disc co-operating with a reciprocable pitman or connecting rod having a plurality of fixed contact members operatively engaging said guide ways.

In the accompanying drawings, Figure 1 is a perspective view of a crank disc and pitman constructed in accordance with this invention, the crank shown being capable of imparting four reciprocations to the pitman for one revolution.

Figure 1:
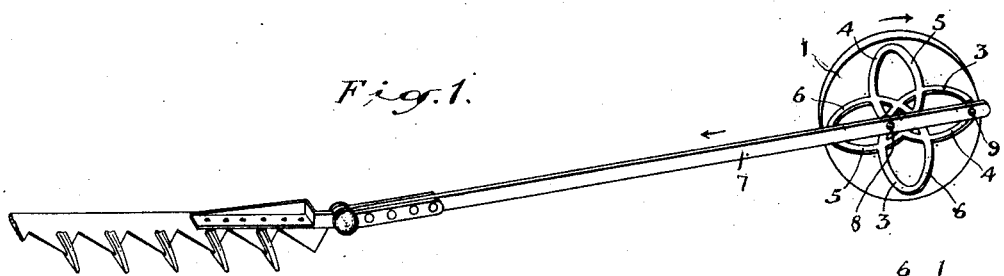
Figure 2:
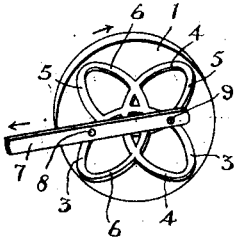
Figure 2 is a perspective view of the crank and the engaging end of the pitman shown in Figure 1, the crank being turned about one-eighth of a revolution.

Referring to the drawings, the crank disc 1, shown in Figures 1 and 2, is formed with a plurality of groove guide ways 3, 4, 5 and 6 which are each an arc of a circle and the outer end of the arcs are joined successively in short curved arcs. The arcs 3, 4, 5 and 6 overlap the axis of the disc.

The pitman 7 is provided with a pair of fixed roller pins 8 and 9 and these are spaced apart so that when one pin is traversing the central portion of one of the large arc-shaped grooves the other traverses the end connecting groove to follow into the outer end of the next succeeding arc. When the crank is in the position shown in Figure 1 the pin 8 engages in the groove 3 midway between its ends and as the crank rotates in the direction indicated by arrow the arc of the groove 3 engages the pin 9 driving the pitman forward as indicated by arrow. This movement continues until the pin 8 reaches the end of groove 3 when said pin follows into the groove 6 and the arc of the groove 6 then drives the pitman in the opposite direction so that in one quarter of a revolution of the crank disc the pitman is operated forward and back. This movement continues throughout the operation.

It will be seen that as the outer sweep of the grooves engages one of the operating pins and effects a drawing action the inner sweep engages and pushes the other pin and while the outer end of the sweep imparts speed of movement the inner sweep being close to the axis of rotation imparts application of power. This result is owing to the relative distances of the driven pins from the axis of rotation of the crank disc.

The principle of the transmission of rotary movement to reciprocating movement described may be applied in a multiplicity of designs and quite a number of ratios of movement may be obtained.

Figure 3:
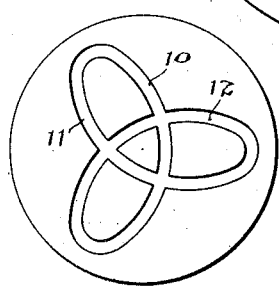
Figure 3 is a plan view of a crank showing a modified arrangement of guide ways.

In Figure 3 a triple arrangement of major curves is shown, the grooves 10, 11 and 12 being arranged in the relative angular position of 120° instead of 90° as shown in Figures 1 and 2.

Figure 4:
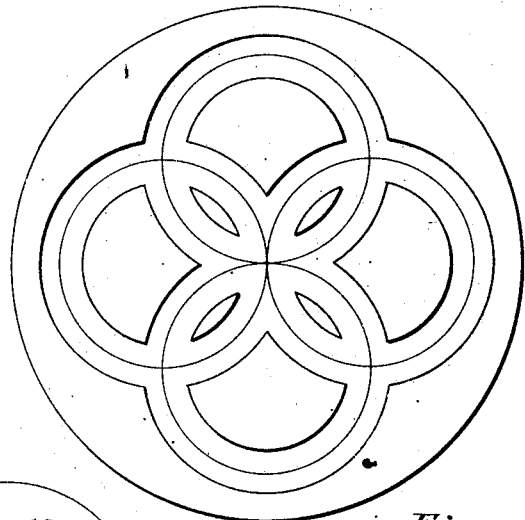
Figure 4 is an enlarged plan view of another form of four movement crank disc.

In Figure 4 the grooves are shown in an arrangement of four circular paths which intersect at the axis of the disc. This arrangement of grooves operates the pitman with a uniform reciprocating movement.

Figure 5:
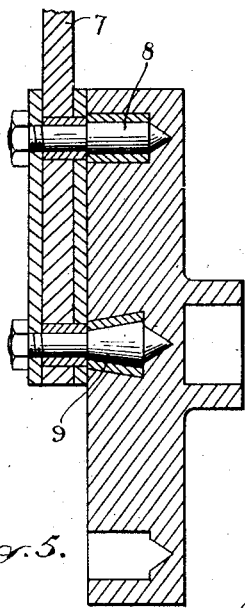
Figure 5 is a transverse mid-sectional view of the crank disc shown in Figure 4 showing the fixed roller members in the guide ways.

In the sectional view Figure 5 the pitman 7 is shown provided with the roller pins 8 and 9 and the roller portion of the pin 9 is shown flaring to engage an undercut groove. This form may be found desirable in order to hold the pitman in operative engagement without the use of other means.

Figure 6:
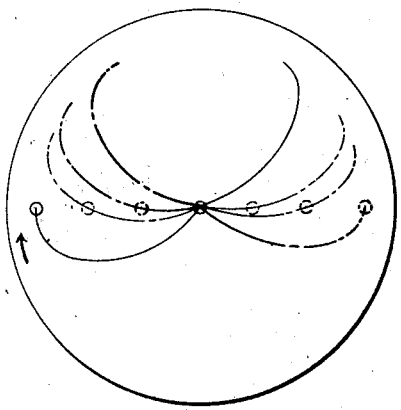
Figure 6 is a diagram illustrating the manner of developing the curves of the guides to effect a straight reciprocal movement of the pitman.

In the diagram, Figure 6, is shown the manner of plotting curves by trammel to enable a connecting rod being operated in a straight reciprocal movement back and forth in the same line.

A great variety of arrangements of intersecting curved guide ways may be devised in accommodating this invention to various mechanisms without departing from the spirit of the invention.

The invention may be utilized in numerous types of mechanisms such as agricultural implements, pumps, engines, etc.

From the foregoing it will be seen that, as hereinbefore described, I have discovered a new art and invention in devising the means to make it useful and that consequently both discovery and invention are involved.

What I claim as my invention is:

1. A crank mechanism, comprising a disc rotatably mounted and having a plurality of arc-shaped grooves curving inwardly from adjacent the perimeter toward the axis of the crank and intersecting adjacent the axis, the outer ends of paired curves being interconnected in curved arcs, a pitman having a pair of fixed contacts extending into and operatively engaging said grooves in constant driving contact.

2. A crank mechanism comprising a disc rotatably mounted and having a plurality of intersecting arc-shaped flared guideways having their outer ends joining, a pitman having a pair of fixed contacts engaging said guideways and driven thereby on the rotation of the disc, the contacts consisting of roller pins suitably flared to engage with the flared arc-shaped guideways.

3. A crank mechanism, comprising a disc rotatably mounted and having a plurality of arc-shaped grooves curving inwardly from adjacent the perimeter toward the axis of the crank and intersecting adjacent the axis, the outer ends of paired curves being interconnected in curved arcs, a pitman having a plurality of fixed contacts extending into and operatively engaging said grooves in constant driving contact.

JOHN DAWSON.